United States Patent
Bower et al.

(10) Patent No.: US 9,876,335 B2
(45) Date of Patent: Jan. 23, 2018

(54) SYSTEM, METHOD AND DEVICE FOR RACKING CIRCUIT BREAKERS

(71) Applicant: ABB Technology Ltd., Zürich (CH)

(72) Inventors: Andrew Bower, Amherst, NH (US);
Michael J. Murry, Durham, NC (US);
Harshavardhan M. Karandikar, Longwood, FL (US)

(73) Assignee: ABB Schweiz AG, Baden (CH)

( * ) Notice: Subject to any disclaimer, the term of this patent is extended or adjusted under 35 U.S.C. 154(b) by 194 days.

(21) Appl. No.: 14/837,840

(22) Filed: Aug. 27, 2015

(65) Prior Publication Data

US 2017/0063055 A1   Mar. 2, 2017

(51) Int. Cl.
*H02B 11/127* (2006.01)
*H01H 71/02* (2006.01)

(52) U.S. Cl.
CPC ....... *H02B 11/127* (2013.01); *H01H 71/0207* (2013.01)

(58) Field of Classification Search
CPC .......................... H02B 11/127; H01H 71/0207
USPC ......... 200/400, 50.21, 50.22, 50.24; 361/606
See application file for complete search history.

(56) References Cited

U.S. PATENT DOCUMENTS

| | | |
|---|---|---|
| 1,734,475 A | 11/1929 | Dedge |
| 2,100,272 A | 11/1937 | Sawyer |
| 2,184,958 A | 12/1939 | Goddard |
| 2,202,299 A | 5/1940 | Pelkey |
| 2,487,915 A | 11/1949 | Wyzenbeek |
| 2,747,415 A | 5/1956 | Bennett |
| 3,784,764 A * | 1/1974 | Wilson ................. H02B 11/133 200/400 |
| 4,062,082 A | 12/1977 | Azzopardi |
| 4,728,757 A | 3/1988 | Buxton et al. |
| 5,477,017 A | 12/1995 | Swindler et al. |
| 6,066,814 A * | 5/2000 | Smith ................. H02B 11/133 200/50.22 |
| 6,897,388 B2 | 5/2005 | Greet |
| 7,019,230 B1 | 3/2006 | Vaill et al. |
| 7,946,197 B2 | 5/2011 | Blom et al. |
| 8,156,639 B1 | 4/2012 | Ledbetter et al. |
| 1,065,627 A1 | 6/2013 | Redburn |
| 8,604,369 B2 | 12/2013 | Greer et al. |
| 2011/0192707 A1 | 8/2011 | Sorensen |
| 2013/0037394 A1 | 2/2013 | Greer et al. |
| 2013/0186736 A1 | 7/2013 | Keim et al. |
| 2013/0258104 A1 | 10/2013 | McClung et al. |

* cited by examiner

*Primary Examiner* — Edwin A. Leon
(74) *Attorney, Agent, or Firm* — Taft Stettinius & Hollister LLP

(57) ABSTRACT

Systems, devices and methods for racking circuit breakers in a switchgear cabinet include a drive mechanism that is flexibly linked to a racking mechanism associated with each circuit breaker. The drive mechanism can be connected for racking multiple circuit breakers without requiring re-positioning of the drive mechanism.

20 Claims, 2 Drawing Sheets

SYSTEM, METHOD AND DEVICE FOR RACKING CIRCUIT BREAKERS

FIELD OF THE INVENTION

This invention relates generally to racking circuit breakers in switchgear housings and, more specifically, to improvements in racking the circuit breakers.

BACKGROUND

In electrical power distribution systems, individual circuit breakers are housed within a switchgear cabinet and periodically need to be disconnected, tested and re-connected. The disconnection and re-connection of the circuit breakers is accomplished by "racking" or displacing the circuit breakers in the switchgear cabinet via a racking mechanism associated with the circuit breaker.

In order to rack the circuit breaker, the operator can be required to wear protective personal equipment that is heavy and cumbersome while operating a racking tool. The tool for racking the circuit breakers typically includes a handle that is inserted through an opening in the cabinet and engaged to the racking mechanism within the cabinet. The racking mechanism is then screw-driven by rotating the handle to displace the circuit breaker in the cabinet for disconnection and re-connection of the circuit breaker with conductors in the switchgear cabinet.

Since such circuit breakers may be installed in energized switchgear, the racking of circuit breakers out of and into the switchgear is potentially dangerous for the operator. The ability to efficiently and safely complete the racking procedure is further hindered by the cumbersome personal protective equipment and the required manipulation of the racking tool. For example, racking tools can include heavy and/or cumbersome components, such as a motor and elongated rigid shaft, that are required to be aligned with the racking mechanism and maintained in alignment during the racking process. Therefore, improvements are needed in this area.

SUMMARY

According to one aspect of the present disclosure, there is disclosed a circuit breaker racking device and method that employs a flexible connecting member that links a drive mechanism with a rack engaging element. The rack engaging element is removably engageable with a racking mechanism associated with the circuit breaker. The drive mechanism is operable to rotate the rack engaging element via the flexible connecting member to operate the racking mechanism and move the circuit breaker on a support into and out of engagement with conductors in the switchgear cabinet.

The flexible connecting member provides a flexible link that allows the rack engaging element to be moved from one racking device to another in the switchgear cabinet without requiring the re-positioning of the drive mechanism or alignment of the drive mechanism with the next racking device. In addition, the flexible connecting member and rack engaging element can move with the racking mechanism as it drives the circuit breaker in or out of the switchgear cabinet via the racking mechanism, while the drive mechanism can remain stationary during rotation and/or displacement of the racking device.

In accordance with another aspect of the present disclosure, a system for racking a circuit breaker is disclosed that includes a racking device with a drive mechanism and a rack engaging element flexibly connected to the drive mechanism, a support for the drive mechanism, and a plurality of racking mechanisms for displacing respective ones of a plurality of circuit breakers in a switchgear cabinet. The rack engaging element is movable via the flexible connection with the drive mechanism to connect with respective ones of the racking mechanisms. A rotational torque from the drive mechanism is applied to the racking mechanism via the rack engaging element through the flexible connection of the rack engaging element, which displaces the associated circuit breaker without moving or re-positioning the drive mechanism into alignment with the racking mechanism.

In accordance with another aspect of the present disclosure, a method includes racking or displacing a circuit breaker in a switchgear cabinet by rotating a racking mechanism coupled to the circuit breaker via operation of a drive mechanism flexibly connected to the racking mechanism. The method may further include disengaging the drive mechanism from a first racking mechanism and engaging the drive mechanism with a second racking mechanism without re-positioning the drive mechanism. The method may also include rotating a flexible connecting member to operate the racking mechanism and displace the circuit breaker.

Further aspects, embodiments, forms, features, benefits, objects, and advantages shall become apparent from the detailed description and figures provided herewith.

DETAILED DESCRIPTION OF THE ILLUSTRATED EMBODIMENTS

Figure 1:
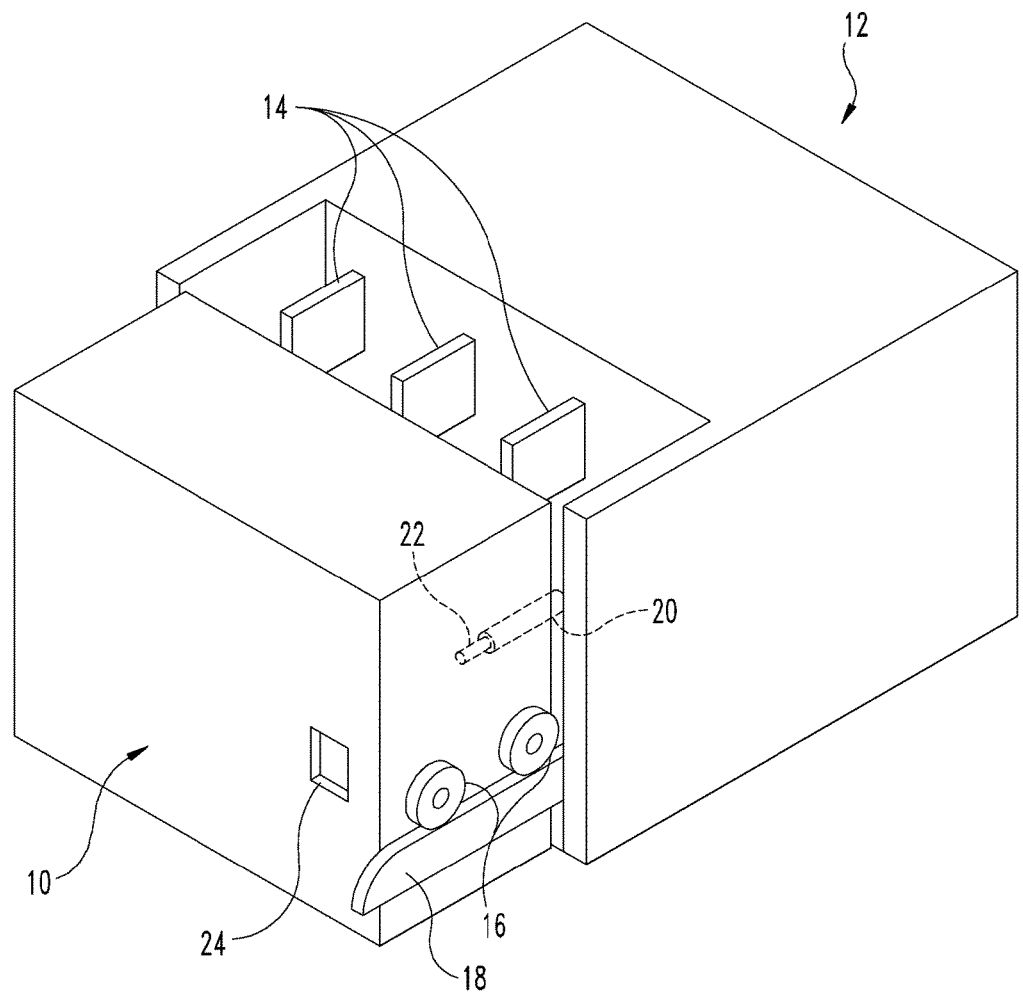
FIG. 1 is a diagrammatic perspective view of a prior art circuit breaker and switchgear compartment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, a circuit breaker 10 is shown conventionally mounted for movement into and out of a switchgear compartment 12 for connection to a plurality of electrical connectors 14. The circuit breaker 10 can include rollers 16 mounted on a rail 18. Only one rail 18 is shown in FIG. 1, it being understood that two or more rails could be provided for each circuit breaker 10. As further shown in FIG. 2, each circuit breaker 10a and 10b of switchgear cabinet 11 is also coupled to a respective one of the racking mechanisms 20a and 20b (generically referred to herein as circuit breaker 10 and racking mechanism 20). Each racking mechanism 20 includes a translation member 22 operable displace the associated circuit breaker 10 via rollers 16 rolling along rail 18 into and out of switchgear compartment 12. An opening 24 in front of the circuit breaker 10 can be provided for enabling a tool such as racking device 30 (FIG. 2) to be coupled in removable engagement with an associated translation member 22 of each circuit breaker 10. Not all details associated with a suitable racking mechanism are shown, it being understood that any conventional racking mechanism is contemplated. One example, by way of illustration and not limitation, is shown in U.S. Pat. No. 8,891,229 issued Nov. 18, 2014, the disclosure of which is incorporated herein by reference in its entirety.

Figure 2:
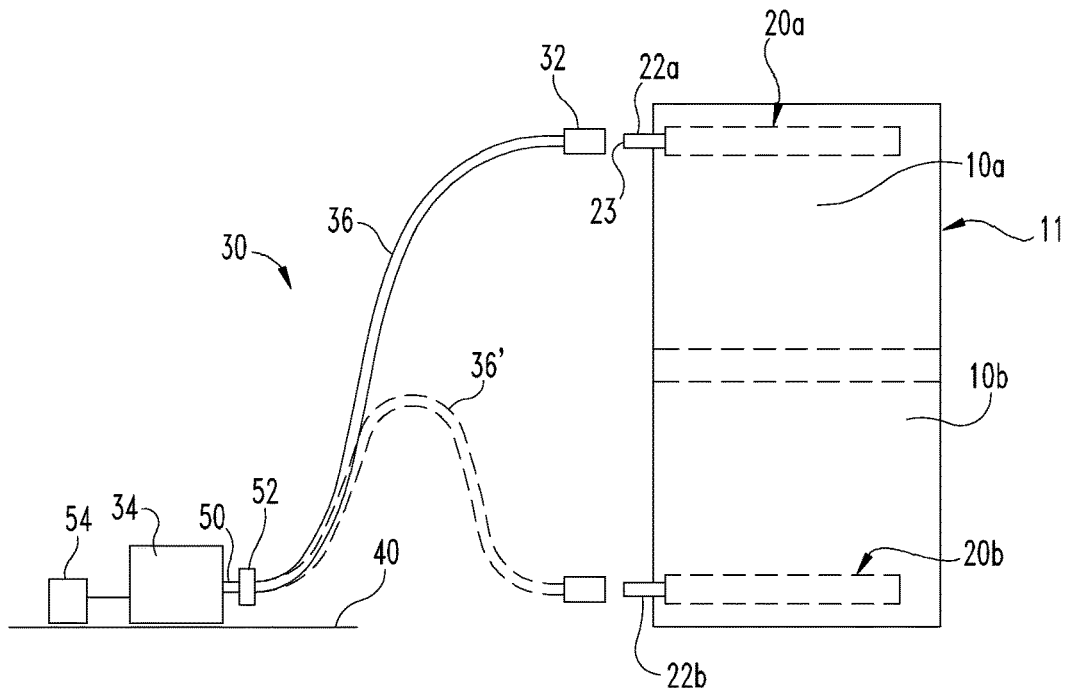
FIG. 2 is a diagrammatic elevation view of a switchgear cabinet housing the circuit breaker and compartment of FIG. 1 and a circuit breaker racking device.
Figure 3:
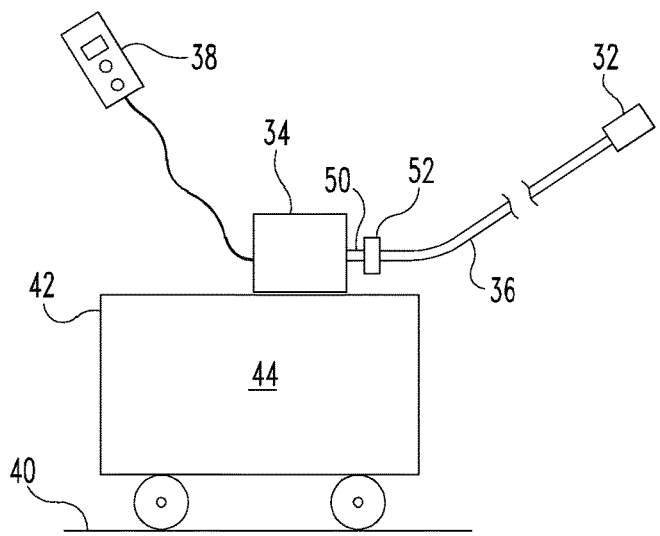
FIG. 3 is an end view of another embodiment racking device.

Referring to FIG. 2, the racking device 30 is shown including a rack engaging element 32 for engaging racking mechanism 20, a drive mechanism 34, and a flexible connecting member 36 that flexibly links rack engaging element 32 with drive mechanism 34. Design of rack engaging element 32 may be determined in part by the design of end 23 of translation member 22a, as well as the door of the associated switchgear compartment. Certain doors have interlock elements that prevent the circuit breaker from being racked from specific positions unless an action, such as depressing of a lever on the door, is taken. Rack engaging element 32 can be designed such that a lever or the like is depressed during the first rotation of rack engaging element 32. In some embodiments, racking device 30 may include an associated wired or wireless remote control assembly 38, such as shown in FIG. 3, which is operably connected to drive mechanism 34 to turn on and off drive mechanism 34, and to select the direction of rotation (clockwise or counterclockwise) of output shaft 50 of drive mechanism 34. Drive mechanism 34 is operable to apply a rotational torque to rack engaging element 32 through rotation of flexible connecting member 36. The rotational torque applied to translation member 22 from drive mechanism 34 through flexible shaft 36 and rack engaging element 32 is sufficient to move circuit breaker 10 into and/or out of compartment 12 by operation of racking mechanism 20. Drive mechanism 34 may also be structured so as to measure a number of rotations of flexible connecting member 36. Given a known or determinable starting position of flexible connecting member 36, racking device 30 can thus determine the position of a circuit breaker in the switchgear compartment.

In one embodiment, drive mechanism 34 includes an electric motor with a power supply 54 and a gear train 52 connecting the output shaft 50 to flexible connecting member 36. The power supply 54 can be an AC power supply or a DC power supply. The gear train 52 can be configured to reduce the shaft speed and to produce sufficient torque to move the circuit breaker 10 at a reasonable speed. In one embodiment, the output of the drive mechanism 34 is capable of applying, through flexible connecting member 36, 420 inch pounds of torque to translation member 22 at a speed of around 60 rpms. Other torque and rotational speeds are also contemplated that are suitable for racking of circuit breakers. In another embodiment, the drive mechanism 34 is a manually operated drive mechanism, such as a hand crank or other device capable of rotating flexible connecting member 36. However, since connecting member 36 is flexible, it is not necessary to re-position or align drive mechanism 34 with translation member 22 to rotate translation member 22. Drive mechanism 34 can be supported on the floor 40 as shown in FIG. 2, or on an elevated support surface 42 such as shown in FIG. 3. Support surface 42 can be a stationary surface above the floor, or a mobile surface provided on a vehicle 44 as shown in FIG. 3.

Figure 4A:
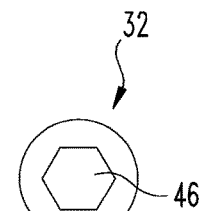
FIG. 4A is an end elevation view of a rack engaging element of the racking device.

Rack engaging element 32 is secured to an end of flexible connecting member 36 so that rotation of connecting member 36 rotates rack engaging element 32 to rotate translation member 22. FIG. 4A shows an end view of rack engaging element 32. In the illustrated embodiment, the rack engaging element 32 includes a hex-shaped end opening 46 that engages a hex shaped end 23 of translation member 22. Other embodiments contemplate other suitably shaped end openings for engagement with the end 23 of translation member 22 to apply a rotational torque thereto. In still other embodiments, rack engaging element 32 is configured to be inserted in an opening of translation member 22 or secured to translation member 22 in any suitable manner to apply a rotational torque thereto.

Figure 4B:
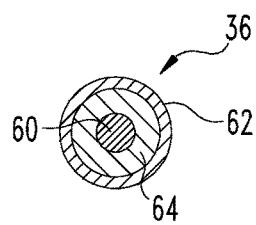
FIG. 4B is a diagrammatic cross sectional view of the flexible connecting element of the racking device.

Referring to FIG. 4B, there is shown a diagrammatic cross section of flexible connecting member 36. Flexible connecting member 36 can include an inner rod 60, and outer casing 62, and a plurality of wires 64 spirally wrapped around inner rod 60. Casing 62 provides a sheath around wires 64. In one embodiment, the flexible connecting member 36 is bidirectional so that torque can be applied to translation member 22 by rotation of flexible connecting member 36 in either direction.

The devices and systems disclosed herein can be employed in methods for racking circuit breakers. In one method, drive mechanism 34 is connected to translation member 22 via flexible connecting member 36 and rack engaging member 32. A rotational torque is applied to translation member 22 by rotating flexible connecting member 36, which results in the displacement of circuit breaker 10 relative to switchgear compartment 12. As shown in FIG. 2, rack engaging member 32 can then be disengaged from the first translation member 22a and engaged to another second translation member 22b by bending or flexing flexible connecting member 36, as indicated by flexible connecting member 36 having one or more bends therein. Since connecting member 36 is flexible, drive mechanism 34 need not be moved or re-positioned to displace a second circuit breaker 10b. As a result, the racking of the circuit breakers is accomplished with less physical effort, less lifting and alignment of racking tools, and at increased safety for the operators. In addition, there is no need to provide a universal connection between connecting member 36 and rack engaging member 32 since connecting member 36 flexes to provide the necessary alignment and compensates for angular and axial misalignment of the connecting member 36 with the translation member 22.

According to one aspect, there is disclosed a racking device for operating a racking mechanism to rack a circuit breaker into and out of electrical switchgear. The racking device includes a drive mechanism, a rack engaging element for engaging the racking mechanism, and a flexible connecting member flexibly linking the rack engaging element with the drive mechanism. The drive mechanism is operable to rotate the flexible connecting member to apply a rotational torque to the rack engaging element to operate the racking mechanism and rack the circuit breaker into and out of the electrical switchgear.

In one embodiment, the drive mechanism includes a motor and a power supply. In a refinement of this embodiment, the drive mechanism includes a gearbox connecting the motor and the flexible connecting member. In another embodiment, the flexible connecting member is an elongated flexible shaft that is bidirectionally rotatable to apply the rotational torque to the rack engaging element. In a refinement of this embodiment, the rack engaging element includes a hex shaped end opening for receiving a hex shaped end of the racking mechanism.

In another embodiment, the drive mechanism is stationary, the rack engaging element is rotatable with rotation of the flexible connecting member, and the rack engaging element is repositionable relative to the drive mechanism by bending the flexible connecting member to align the rack engaging element with the racking mechanism. In yet another embodiment, a remote control is coupled to said drive mechanism for remotely controlling the drive mechanism.

According to another aspect, a system for racking a plurality of circuit breakers in a switchgear cabinet is provided. The system includes a racking device with a drive mechanism and a rack engaging element flexibly connected to the drive mechanism. The drive mechanism is operable to rotate the rack engaging element through the flexible connection. The system further includes a support for the drive mechanism. The rack engaging element is, without moving the drive mechanism, movable relative to the drive mechanism via the flexible connection for selective engagement with one of a plurality of racking mechanisms each operable to displace respective ones of the plurality of circuit breakers in the switchgear cabinet.

In one embodiment, the drive mechanism is flexibly connected to the rack engaging element with an elongated flexible connecting member that includes an internal rod, a plurality of wires spirally wrapped around the internal rod, and an outer casing around the plurality of wires. In another embodiment, the support is provided on a vehicle and the drive mechanism includes an electric motor. In yet another embodiment, the support is stationary and the drive mechanism includes an electric motor.

According to a further aspect, a method for racking a circuit breaker includes rotating a racking mechanism coupled to the circuit breaker to displace the circuit breaker in a switchgear cabinet. The racking mechanism is rotated by a rotational torque applied through a flexible connecting member that is rotated by a drive mechanism connected to the racking mechanism with the flexible connecting member.

In one embodiment of the method, the drive mechanism is not aligned with the racking mechanism and the flexible connecting member between the drive mechanism and the racking mechanism includes one or more bends. In another embodiment of the method, the drive mechanism is an electric motor.

In yet another embodiment, the method includes disengaging the drive mechanism from the racking mechanism and engaging the drive mechanism with a second racking mechanism without re-positioning the drive mechanism. In a refinement of this embodiment, the flexible connecting member includes a rack engaging member at an end of the flexible connecting member opposite the drive mechanism, and the rack engaging member is removably engageable with the racking mechanism.

In another embodiment, the flexible connecting member forms an elongated shaft with one or more bends between the drive mechanism and the racking mechanism. In a refinement of this embodiment, the flexible connecting member includes an internal rod, a plurality of wires wrapped around the internal rod, and an outer casing around the plurality of wires.

In another embodiment, the method includes disengaging a rack engaging member of the flexible connecting member from the racking mechanism; bending the flexible connecting member to engage the rack engaging member to a second racking mechanism; and rotating the second racking mechanism via a rotational torque applied by the flexible connecting member through operation of the drive mechanism. In a refinement of this embodiment, the drive mechanism remains stationary during the disengaging and bending.

While the invention has been illustrated and described in detail in the drawings and foregoing description, the same is to be considered as illustrative and not restrictive in character, it being understood that only the certain embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "engaged," "connected," "supported," and "coupled" and variations thereof are used broadly and encompass both direct and indirect engagements, connections, supports, and couplings.

What is claimed is:

1. A racking device for operating a racking mechanism to rack a circuit breaker into and out of electrical switchgear, the racking device comprising:
   a drive mechanism;
   a rack engaging element for engaging the racking mechanism; and
   a flexible connecting member that includes an elongated flexible shaft flexibly linking the rack engaging element with the drive mechanism, wherein the drive mechanism is operable to rotate the flexible connecting member to apply a rotational torque to the rack engaging element by rotating the flexible shaft to operate the racking mechanism and rack the circuit breaker into and out of the electrical switchgear.

2. The racking device according to claim 1, wherein the drive mechanism includes a motor and a power supply.

3. The racking device according to claim 2, further comprising a gearbox connecting the motor and the flexible connecting member.

4. The racking device according to claim 1, wherein the flexible connecting member is bidirectionally rotatable to apply the rotational torque to the rack engaging element, the connecting member including an inner rod, an outer casing around the inner rod, and a plurality of wires spirally wrapped around the inner rod.

5. The racking device according to claim 4, wherein the rack engaging element includes a hex shaped end opening for receiving a hex shaped end of the racking mechanism.

6. The racking device according to claim 1, wherein:
   the drive mechanism is stationary;
   the rack engaging element is rotatable with rotation of the flexible connecting member; and
   the rack engaging element is repositionable relative to the drive mechanism by bending the flexible connecting member to align the rack engaging element with the racking mechanism.

7. The racking device according to claim 1, further comprising a remote control coupled to the drive mechanism for remotely controlling the drive mechanism.

8. A system for racking a plurality of circuit breakers in a switchgear cabinet, comprising:
   a racking device with a drive mechanism and a rack engaging element flexibly connected to the drive mechanism with an elongated flexible shaft, wherein the drive mechanism is operable to rotate the rack engaging element through the flexible connection; and a support for the drive mechanism, wherein the rack engaging element is, without moving the drive mechanism, movable by bending the flexible shaft relative to the drive mechanism for selective engagement with one of a plurality of racking mechanisms each operable to displace respective ones of the plurality of circuit breakers in the switchgear cabinet.

9. The system of claim 8, wherein the elongated flexible shaft includes an internal rod, a plurality of wires spirally wrapped around the internal rod, and an outer casing around the plurality of wires.

10. The system of claim 8, wherein the support is provided on a vehicle and the drive mechanism includes an electric motor.

11. The system of claim 8, wherein the support is stationary and the drive mechanism includes an electric motor.

12. A method for racking a circuit breaker, comprising:
rotating a racking mechanism coupled to the circuit breaker to displace the circuit breaker in a switchgear cabinet, wherein the racking mechanism is rotated by a rotational torque applied through a rotating flexible connecting member that is rotated by a drive mechanism connected to the racking mechanism with the flexible connecting member.

13. The method of claim 12, wherein the drive mechanism is not aligned with the racking mechanism and the flexible connecting member is bent between the drive mechanism and the racking mechanism with one or more bends to align and engage a rack engaging member at the end of the flexible connecting member with the racking mechanism.

14. The method of claim 12, wherein the drive mechanism is an electric motor.

15. The method of claim 12, further comprising disengaging the drive mechanism from the racking mechanism and engaging the drive mechanism with a second racking mechanism without re-positioning the drive mechanism.

16. The method of claim 15, wherein the flexible connecting member includes a rack engaging member at an end of the flexible connecting member opposite the drive mechanism, and the rack engaging member is removable and engageable with the racking mechanism.

17. The method of claim 12, wherein the flexible connecting member forms an elongated shaft with one or more bends between the drive mechanism and the racking mechanism.

18. The method of claim 17, wherein the flexible connecting member includes an internal rod, a plurality of wires wrapped around the internal rod, and an outer casing around the plurality of wires.

19. The method of claim 12, further comprising:
disengaging a rack engaging member of the flexible connecting member from the racking mechanism;
bending the flexible connecting member to engage the rack engaging member to a second racking mechanism; and
rotating the second racking mechanism via a rotational torque applied by the flexible connecting member through operation of the drive mechanism.

20. The method of claim 19, wherein the drive mechanism remains stationary during the disengaging and bending.

* * * * *

UNITED STATES PATENT AND TRADEMARK OFFICE
CERTIFICATE OF CORRECTION

PATENT NO. : 9,876,335 B2  
APPLICATION NO. : 14/837840  
DATED : January 23, 2018  
INVENTOR(S) : Andrew Bower et al.

Page 1 of 1

It is certified that error appears in the above-identified patent and that said Letters Patent is hereby corrected as shown below:

On the Title Page

(72) Michael J. Murry, Durham, NC (US) to be replaced with Michael J. Murray, Durham, NC (US)

Signed and Sealed this  
Tenth Day of April, 2018

Andrei Iancu  
*Director of the United States Patent and Trademark Office*